(12) United States Patent
Tomikawa et al.

(10) Patent No.: US 7,675,681 B2
(45) Date of Patent: Mar. 9, 2010

(54) DISPLAY DEVICE

(75) Inventors: Masahiko Tomikawa, Kumagaya (JP);
Ryoichi Watanabe, Fukaya (JP);
Takashi Sasabayashi, Konosu (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 27 days.

(21) Appl. No.: 11/971,964

(22) Filed: Jan. 10, 2008

(65) Prior Publication Data

US 2008/0186572 A1 Aug. 7, 2008

(30) Foreign Application Priority Data

Feb. 2, 2007 (JP) .............................. 2007-024430

(51) Int. Cl.
*G02B 27/10* (2006.01)
*G02B 9/00* (2006.01)

(52) U.S. Cl. ........................................ 359/619; 359/740

(58) Field of Classification Search ................. 359/619, 359/462, 621, 623; 348/59, E13.012, E13.028, 348/E13.029
See application file for complete search history.

(56) References Cited

U.S. PATENT DOCUMENTS 5,956,001 A * 9/1999 Sumida et al. ................. 345/55
6,628,355 B1 * 9/2003 Takahara .................... 349/106
2003/0072080 A1 * 4/2003 Ariyoshi et al. ............. 359/487
2008/0130126 A1 * 6/2008 Brooks et al. ............... 359/619

FOREIGN PATENT DOCUMENTS

| JP | 11-202313 | 7/1999 |
|---|---|---|
| JP | 2006-39265 | 2/2006 |

OTHER PUBLICATIONS

T. Saishu et al., "53.3: Distortion Control in a One-Dimensional Integral Imaging Autostereoscopic Display System with Parallel Optical Beam Groups," SID 04 Digest, pp. 1438-1441 (2004).

* cited by examiner

*Primary Examiner*—Scott J Sugarman
*Assistant Examiner*—Dawayne A Pinkney
(74) *Attorney, Agent, or Firm*—Finnegan, Henderson, Farabow, Garrett & Dunner, L.L.P.

(57) ABSTRACT

A display device includes a lens array unit, a display unit which is configured such that a first substrate is attached to a second substrate that is disposed between the first substrate and the lens array unit, the display unit having a display area composed of matrix-arrayed pixels, a gap control layer which forms a predetermined gap between the display unit and the lens array unit, and a support member which fixes the display unit and the lens array unit on an outside of the display area of the display unit.

9 Claims, 10 Drawing Sheets

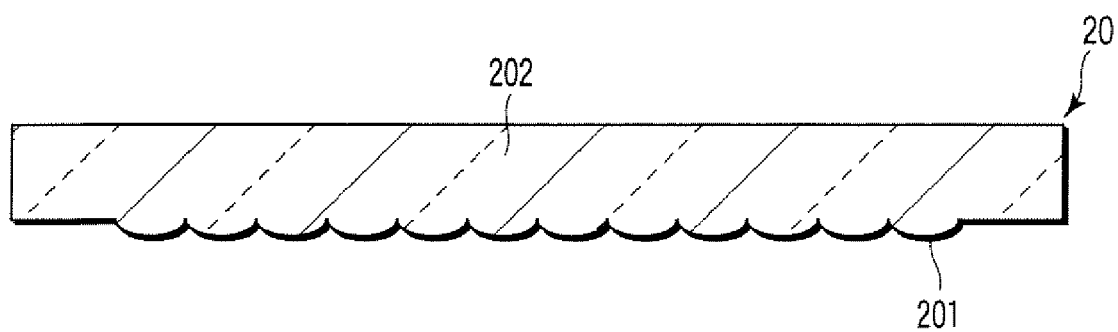
F I G. 5A
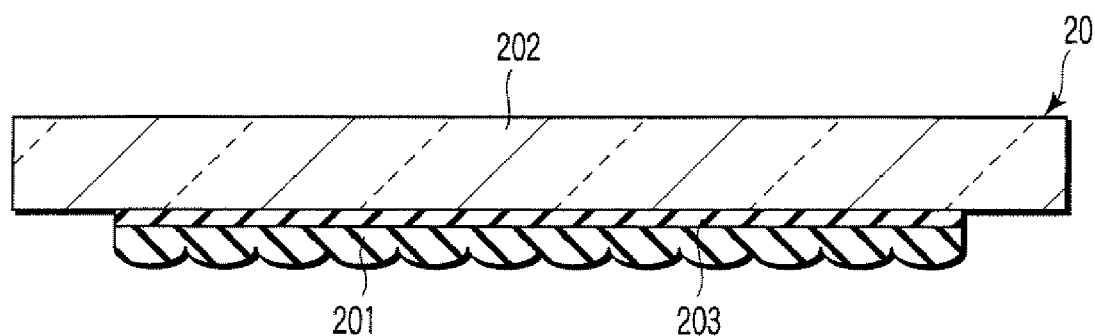
F I G. 5B
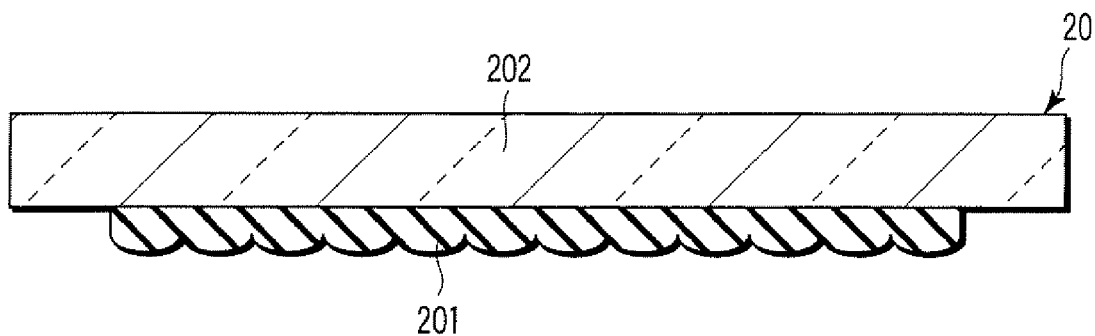
F I G. 5C

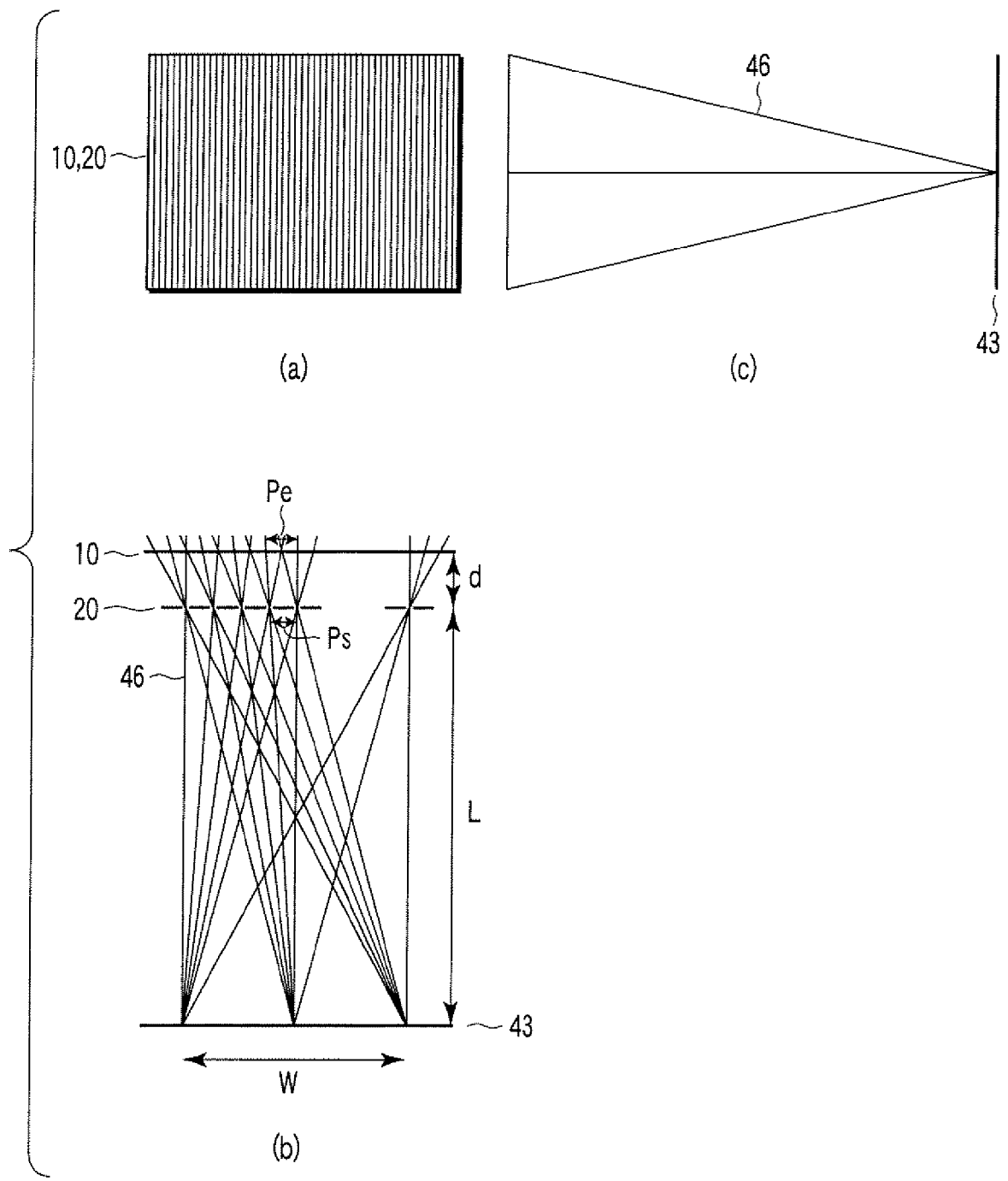
F I G. 10

DISPLAY DEVICE

CROSS-REFERENCE TO RELATED APPLICATIONS

This application is based upon and claims the benefit of priority from prior Japanese Patent Application No. 2007-024430, filed Feb. 2, 2007, the entire contents of which are incorporated herein by reference.

BACKGROUND OF THE INVENTION

1. Field of the Invention

The present invention relates to a display device, and more particularly to a stereoscopic video display device having a lens array unit.

2. Description of the Related Art

There are known various types of stereoscopic image display devices, so-called tree dimension displays, which can display motion video. In recent years, in particular, in the field of flat-panel type displays, there has been an increasing demand for a method that requires no special eyeglasses. Of this type of stereoscopic motion video display devices, a display device that uses the principle of holography can hardly realize full-color motion video. However, full-color motion video can relatively easily be realized by a method in which a light ray control element, which controls light rays from a display unit and turns the light rays to the viewer, is disposed immediately before the display unit (display device) with fixed pixel positions, such as a direct-viewing type or projection type liquid crystal display device or plasma display device.

The light ray control element is generally called "parallax barrier". The light ray control element controls light rays so that different images can be viewed depending on angles, even at the same position on the light ray control element. Specifically, when only right-and-left parallax (horizontal parallax) is imparted, a slit or a lenticular lens sheet (cylindrical lens array) is used. In the case where up-and-down parallax (vertical parallax) is also imparted, a pinhole array or a lens array comprising matrix-arrayed lenses is used. The methods using parallax barriers are further classified into a two-view (binocular) type, a multi-view type, a super-multi-view type (super-multi-view condition of a multi-view type), and integral photography (hereinafter also referred to as "IP"). The basic principle of these methods is substantially the same as the principle that was invented about 100 years ago, and has been used in the field of stereoscopic photography.

Of these methods, the IP method is characterized by a high degree of freedom of view-point position and easy realization of stereoscopic view. In a one-dimensional IP method in which only horizontal parallax is provided and vertical parallax is not provided, a display device with high resolution is relatively easily realized (see, e.g. SID04 Digest 1438 (2004)). On the other hand, as regards the two-view type and multi-view type, there is a problem that the range of viewing-point position which permits stereoscopic view, that is, the visual range, is narrow and there is difficulty in viewing. However, these types are simplest in structure as stereoscopic image display devices, and a display image can easily be created.

It is desirable that the light ray control element be precisely fixed to the display unit with a proper gap being kept from the display unit. Various methods have been developed for fixing a lens array unit, which is one of light ray control elements, to the display unit. Jpn. Pat. Appln. KOKAI Publication No. 11-202313, for instance, discloses a liquid crystal display device wherein a second substrate, on which a micro-lens is disposed, is used on a cover-glass-side outer surface in order to effectively increase the aperture ratio of the pixel, although this liquid crystal display device is not related to the stereoscopic image display apparatus. In particular, this document discloses the structure in which a spacer having the same height as the micro-lens is provided at the outer periphery of the micro-lens on the glass substrate on which the micro-lens is formed, and the glass substrate is attached to the outer surface of the cover glass via the spacer.

In addition, Jpn. Pat. Appln. KOKAI Publication No. 2006-039265, for instance, discloses a micro-lens array plate which has a reduced-pressure layer between a first transparent substrate, on which a lens surface of a micro-lens is formed, and a second transparent substrate that is opposed to the first transparent substrate, with a view to attaining structural stability, and an electrooptical device (liquid crystal device) including this micro-lens array plate, although this technique does not relate to the stereoscopic image display device.

In order to obtain sufficient stereoscopic display characteristics, various design parameters need to be optimized. In particular, in order to obtain desired display characteristics, it is very important to make uniform the lens-pixel gap in the display area in the structure in which the lens array unit and the display unit are combined.

BRIEF SUMMARY OF THE INVENTION

The present invention has been made in consideration of the above-described problems, and the object of the invention is to provide a display device which is capable of obtaining desired display characteristics.

According to an aspect of the present invention, there is provided a display device comprising: a lens array unit; a display unit which is configured such that a first substrate is attached to a second substrate that is disposed between the first substrate and the lens array unit, the display unit having a display area composed of matrix-arrayed pixels; a gap control layer which forms a predetermined gap between the display unit and the lens array unit; and a support member which fixes the display unit and the lens array unit on an outside of the display area of the display unit.

The present invention can provide a display device which is capable of obtaining desired display characteristics.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5A is a cross-sectional view that schematically shows a structure of the lens array unit which is applicable to the display device shown in FIG. 1;

FIG. 5B is a cross-sectional view that schematically shows another structure of the lens array unit which is applicable to the display device shown in FIG. 1;

FIG. 5C is a cross-sectional view that schematically shows still another structure of the lens array unit which is applicable to the display device shown in FIG. 1;

FIG. 10 is a development view that schematically shows the entire structure of the stereoscopic image display device according to the embodiment of the invention.

DETAILED DESCRIPTION OF THE INVENTION

A display device according to an embodiment of the present invention will now be described with reference to the accompanying drawings.

Figure 1:
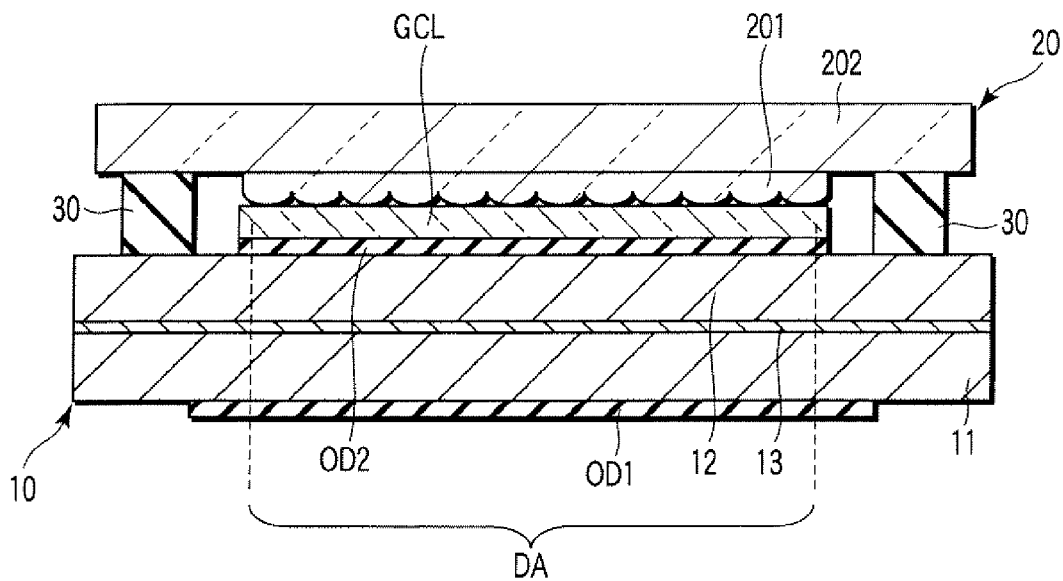
FIG. 1 schematically shows the structure of a display device according to an embodiment of the present invention.

As shown in FIG. 1, the display device is configured to include a display unit 10 and a lens array unit 20 which is a light ray control element. The display unit 10 is configured such that a pair of substrates, namely, a first substrate 11 and a second substrate 12, are attached. The second substrate 12 is disposed between the first substrate 11 and the lens array unit 20.

The display unit 10 is composed of, for example, a liquid crystal display panel, a plasma display panel, an organic electroluminescence (EL) display panel or a field-emission display panel. The kind of the display panel is not limited. In this embodiment, in particular, the example in which the liquid crystal display panel is used as the display unit 10 is described.

Figure 2:
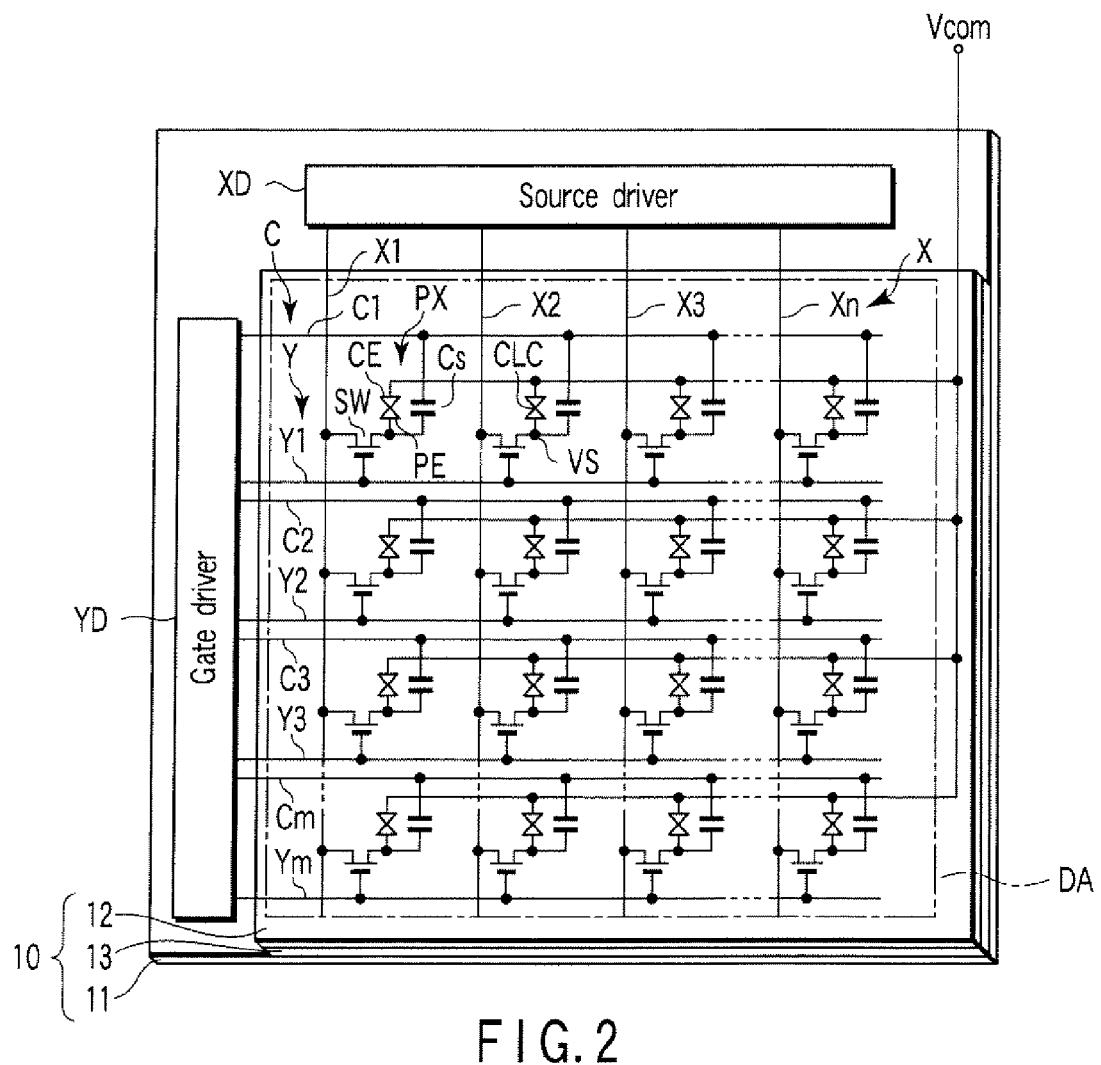
FIG. 2 schematically shows the structure of a display unit (liquid crystal display panel) which is applicable to the display device shown in FIG. 1.
Figure 3:
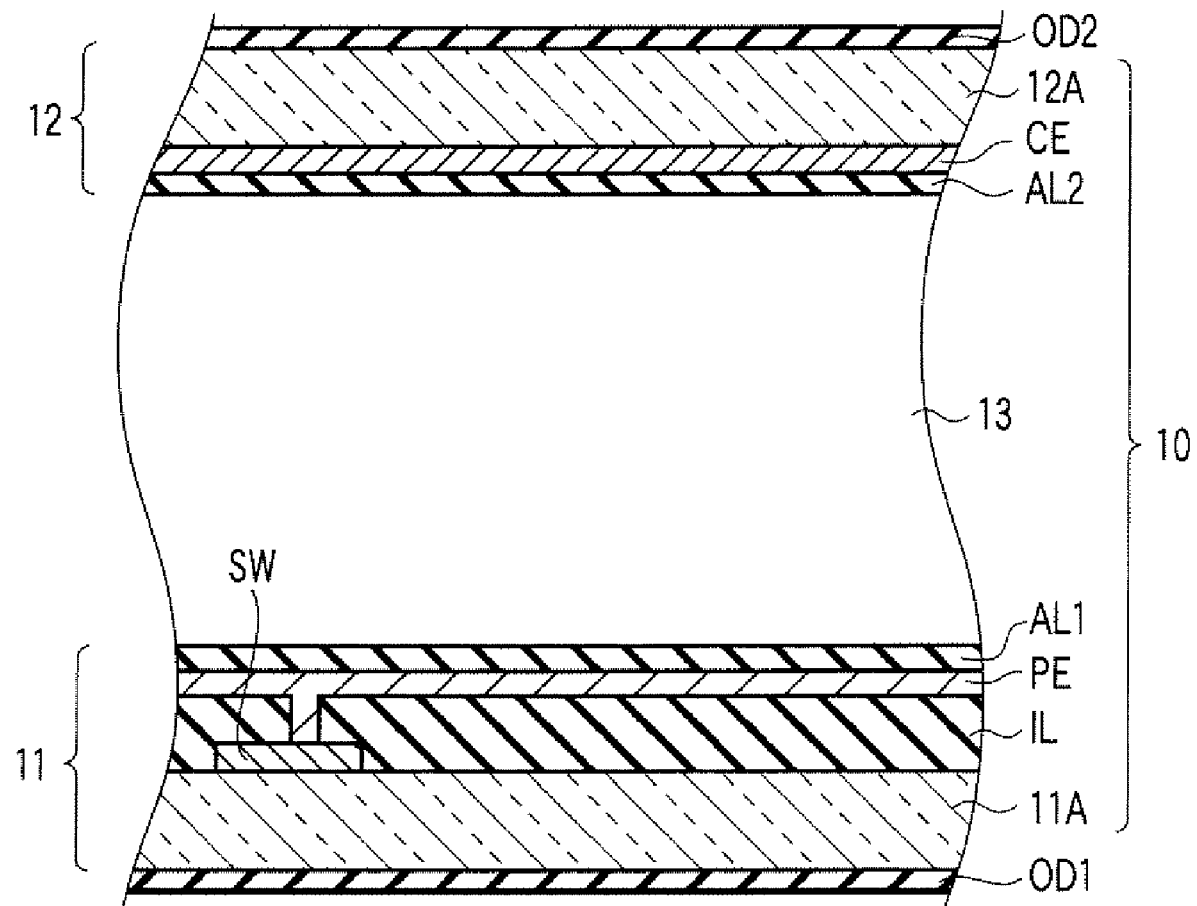
FIG. 3 schematically shows a cross-sectional structure of the display unit shown in FIG. 2.

As shown in FIG. 2 and FIG. 3, the liquid crystal display panel 10 is configured to include a liquid crystal layer 13 between a pair of substrates, namely, a first substrate (array substrate) 11 and a second substrate (counter-substrate) 12, and to have a display area DA which displays an image. The display area DA is composed of a plurality of matrix-arrayed pixels PX.

The first substrate 11 is formed by using a light-transmissive insulating substrate 11A such as a glass substrate. In the first substrate 11, wiring parts for supplying driving signals to the pixels are provided on the insulating substrate 11A.

Specifically, the first substrate 11 includes, as the wiring parts, a plurality of scanning lines Y (Y1 to Ym) and a plurality of storage capacitance lines C (C1 to Cm), which are disposed in a row direction of the pixels PX, a plurality of signal lines X (X1 to Xn) which are disposed in a column direction of the pixels PX, and switching elements SW which are disposed in association with the respective pixels PX. The first substrate 11 further includes pixel electrodes PE which are connected to the respective switching elements SW.

Each of the scanning lines Y is connected to a gate driver YD which supplies a driving signal (scanning signal). Each of the signal lines X is connected to a source driver XD which supplies a driving signal (video signal).

Each of the switching elements SW is composed of, e.g. a thin-film transistor. The switching element SW is disposed at an intersection area between the scanning line Y and signal line X in association with the associated pixel PX. The gate of the switching element SW is connected to the associated scanning line Y (or formed integral with the scanning line Y). The source of the switching element SW is connected to the associated signal line X (or formed integral with the signal line X). The drain of the switching element SW is electrically connected to the associated pixel electrode PE (or formed integral with the pixel electrode PE).

In the example shown in FIG. 3, each pixel electrode PE is disposed on an insulation film IL which covers the switching element SW, and the pixel electrode PE is electrically connected to the drain of the switching element SW via a contact hole which is formed in the insulation film IL. In a transmissive liquid crystal display panel which displays an image by selectively passing backlight that is radiated from a backlight unit, the pixel electrode PE is formed of a light-transmissive electrically conductive material such as indium tin oxide (ITO) or indium zinc oxide (IZO). In a reflective liquid crystal display panel which displays an image by selectively reflecting ambient light (including front light emitted from a front light unit) that comes in from the second substrate 12 side, the pixel electrode PE is formed of a light-reflective electrically conductive material such as aluminum (Al). The surface of the first substrate 11 having this structure is covered with a first alignment film AL1 for controlling the alignment of liquid crystal molecules included in the liquid crystal layer 13.

The second substrate 12 is formed by using a light-transmissive insulating substrate 12A such as a glass substrate. In the second substrate 12, for instance, a counter-electrode CE, which is disposed to be opposed to the plural pixel electrodes PE, is provided on the insulating substrate 12A. The counter-electrode CE is formed of a light-transmissive electrically conductive material. The surface of the second substrate 12 having this structure is covered with a second alignment film AL2 for controlling the alignment of liquid crystal molecules included in the liquid crystal layer 13.

The first substrate 11 and second substrate 12 are disposed in the state in which the pixel electrodes PE and the counter-electrode CE are opposed, and a cell gap is provided between the first substrate 11 and second substrate 12 by spacers (e.g. columnar spacers) which are not shown. The liquid crystal layer 13 is formed of a liquid crystal composition which is sealed in the cell gap between the first substrate 11 and second substrate 12.

In the present embodiment, the liquid crystal mode is not particularly limited. Applicable modes are, for instance, a TN (Twisted Nematic) mode, an OCB (Optically Compensated Bend) mode, a VA (Vertical Aligned) mode and an IPS (In-Plane Switching) mode.

In a color display type liquid crystal display device, the liquid crystal display panel 10 includes a plurality of kinds of pixels, for instance, a red pixel that displays red (R), a green pixel that displays green (G), and a blue pixel that displays blue (B). Specifically, the red pixel includes a red color filter that passes light with a principal wavelength of red. The green pixel includes a green color filter that passes light with a principal wavelength of green. The blue pixel includes a blue color filter that passes light with a principal wavelength of blue. These color filters are disposed on the major surface of the first substrate 11 or the second substrate 12.

Each of the pixels PX includes a liquid crystal capacitance CLC between the pixel electrode PE and the counter-electrode CE. Each of the storage capacitance lines C (C1 to Cm) is capacitive-coupled to the pixel electrodes PE of the associated row, thereby constituting storage capacitances Cs.

The display unit 10, which is formed by applying the transmissive liquid crystal display panel 10, includes a backlight unit (not shown) on the first substrate 11 side. In addition, as shown in FIG. 3, a first optical element OD1 which includes a polarizer plate is disposed on the outer surface of the first substrate 11 in association with the display area DA. Similarly, a second optical element OD2 which includes a polarizer plate is disposed on the outer surface of the second substrate 12. The first optical element OD1 and second optical element OD2 may include retardation plates, where necessary.

Figure 4A:
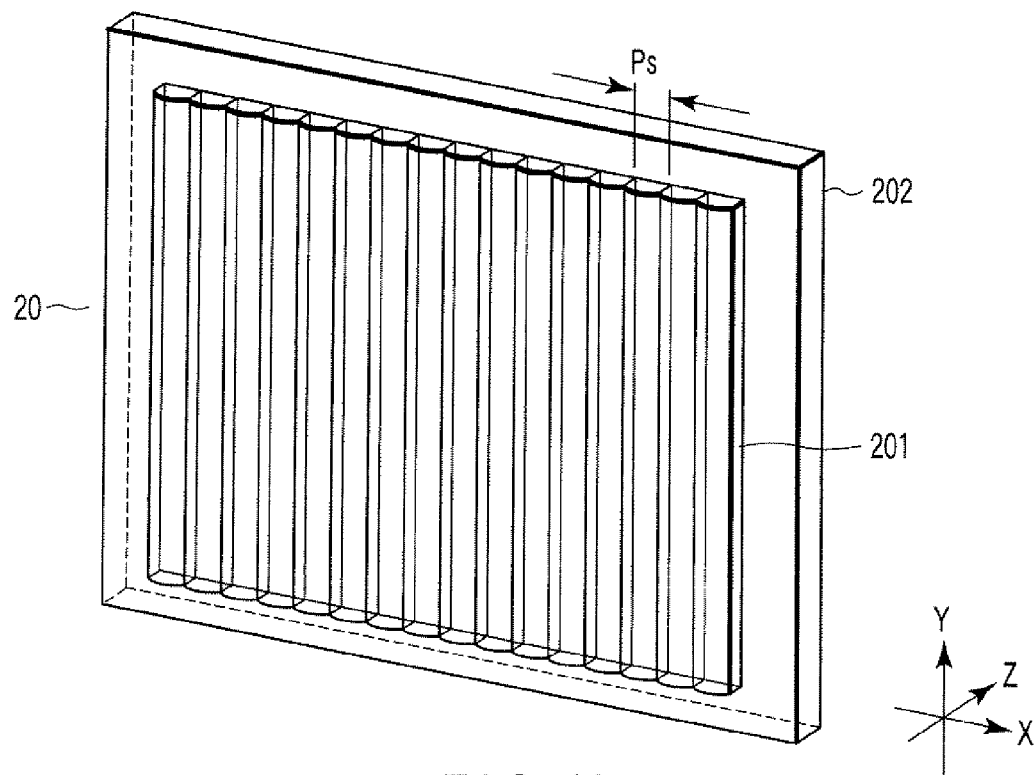
FIG. 4A is a perspective view that schematically shows a structure of a lens array unit which is applicable to the display device shown in FIG. 1.
Figure 4B:
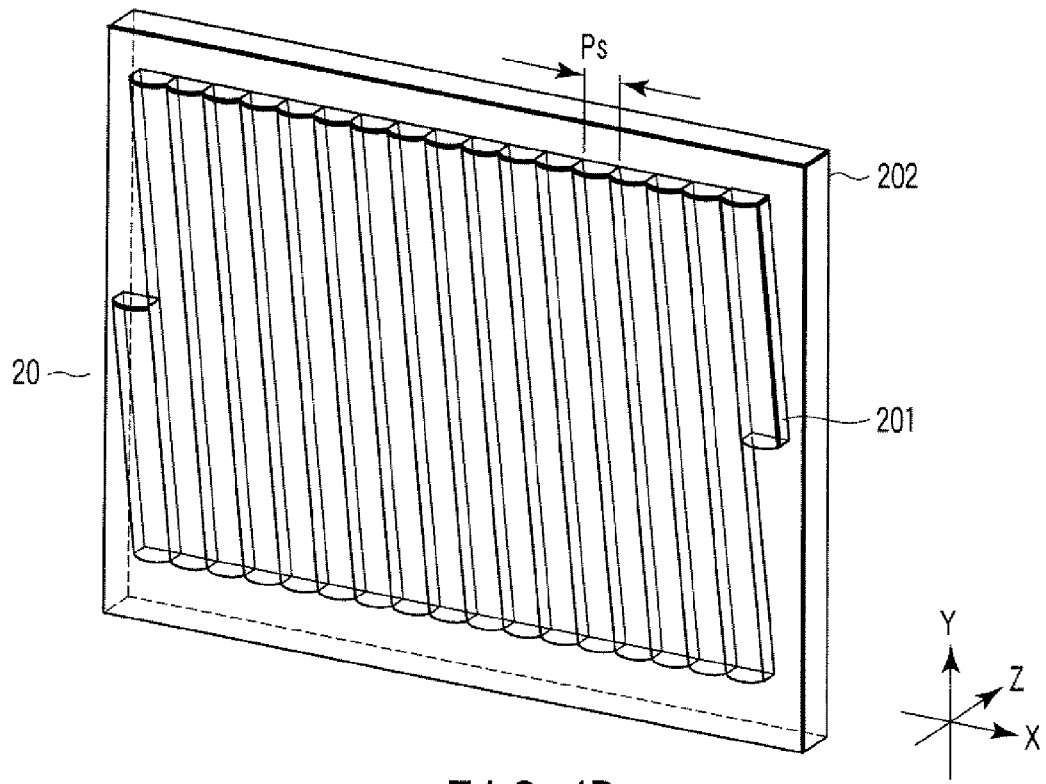
FIG. 4B is a perspective view that schematically shows another structure of the lens array unit which is applicable to the display device shown in FIG. 1.

The lens array unit 20 is formed, for example, in a shape as shown in FIG. 4A or FIG. 4B. Specifically, the lens array unit 20 is configured to include a base body 202 and a lens array layer 201 which is disposed on the base body 202. The lens array layer 201 of the lens array unit 20 is composed of a plurality of cylindrical lenses which are arranged in one direction. For the purpose of convenience, a direction parallel to the direction of extension of the scanning lines is referred to as an X direction, a direction parallel to the direction of extension of the signal lines is referred to as a v direction, and a direction normal to an X-Y plane (i.e. the thickness direction of the display unit 10) is referred to as a Z direction.

In the lens array unit 20 according to the example shown in FIG. 4A, each of the cylindrical lenses has such a shape that the generating line of the cylindrical surface of the cylindrical lens extends in the Y direction, and the plural cylindrical lenses are arranged in the X direction. In the lens array unit 20 according to the example shown in FIG. 4B, each of the cylindrical lenses has such a shape that the generating line of the cylindrical surface of the cylindrical lens is inclined with respect to the X direction and Y direction, and the plural cylindrical lenses are arranged in the X direction.

In the lens array layer 201, the horizontal pitch Ps of cylindrical lenses is a pitch in a direction corresponding to the row direction (i.e. X direction) in the display area DA of the display unit 10.

The lens array layer 201 is formed over an area that is opposed to at least the display area DA when the lens array unit 20 is disposed to be opposed to the display unit 10. In short, the area in which the lens array layer 201 is formed is set to be equal to or greater than the display area DA.

The thickness of the lens array layer 201 (i.e. the thickness from the surface of the base body 202 to the top portion of the cylindrical lens) is, for example, about 0.05 mm to 0.5 mm, and the dimension of a recess between neighboring cylindrical lenses is, for example, about 0.05 mm to 0.1 mm. However, these values are variable in accordance with designs.

The base body 202 is a flat-plate-shaped body which supports the lens array layer 201, and has a size which is equal to or greater than the area in which the lens array layer 201 is formed. The base body 202 has a substantially uniform thickness which is, for example, about 0.7 mm to 1.1 mm. However, where necessary, a thicker base body 202 having a thickness of about several mm may be used.

Various forms of the tens array unit 20 have been proposed, and any of these forms is applicable. Specifically, a lens array unit 20 according to an example shown in FIG. 5A is integrally formed of a glass base body 202 and a glass lens array layer 201. In other words, in the example of FIG. 5A, a lens shape is directly formed by processing the surface of the glass substrate. The lens array unit 20 which is integrally formed of glass is advantageous in that the lens array unit 20 is less susceptible to temperature variations and can maintain a stable performance.

A lens array unit 20 according to an example shown in FIG. 5B is formed by attaching a lens array layer 201 of a resin material to a glass base body 202 via an adhesive layer 203. A lens array unit 20 according to an example shown in FIG. 5C is configured such that a lens array layer 201 of a resin material is directly molded on a glass base body 202. The lens array layer 201 of the resin material may be formed of, e.g. polymethylmethacrylate (PMMA) or polycarbonate (PC). The resin-made lens array layer 201 is advantageous since it can be fabricated at low cost by press molding or injection molding. On the other hand, since the resin material has a higher linear expansion coefficient than the glass of the base body 202, the resin material is easily affected by temperature variations. It is thus desirable to attach the lens array layer 201 to a relatively thick base body 202, thereby to suppress a variation in horizontal pitch Ps.

In the examples shown in FIG. 5A to FIG. 5C, the area of the base body 202 is slightly greater than the area of the lens array layer 201. Thus, an excess portion of the base body 202, where the lens array layer 201 is not formed, may be used as an attachment portion for fixing the lens array unit 20 to the display unit 10.

The lens array unit 20 is fixed to the display unit 10 by a support member 30 with a predetermined gap being provided therebetween. Specifically, as shown in FIG. 1, the lens array unit 20 is disposed such that the lens array layer 201 faces the display unit 10.

It is possible to adopt such a structure that the lens array layer 201 faces the viewer side. However, in the case where the base body 202 with a large thickness is used in order to secure the durability and reliability, the lens focal distance would increase and the lens design would be restricted. Moreover, if a face glass is further disposed on the outer side in order to prevent reflection of ambient light by the lens convex surfaces, the number of parts and the weight would increase.

In particular, in the present embodiment, a gap control layer GCL, which forms a predetermined gap, is disposed between the display unit 10 and lens array unit 20. Specifically, the gap control layer GCL is disposed in an inside area surrounded by the support member 30, is put in contact with the second optical element OD2 that is disposed on the outer surface of the second substrate 12 of the display unit 10, and is put in contact with lens top portions of the lens array layer 201 of the lens array unit 20. The gap control layer GCL forms a uniform gap between the display unit 10 and the lens array unit 20.

The gap control layer GCL is in contact with the lens array layer 201. In order to prevent influence on the lens function of the lens array layer 201, it is desirable to make the refractive index of the material of the gap control layer GCL different from the refractive index of the material of the lens array layer 201.

On the outside of the display area DA of the display unit 10, the support member 30 fixes the display unit 10 and the lens array unit 20 in the state in which a predetermined gap is provided therebetween. In the example shown in FIG. 1, the surface of the lens array layer 201 does not come in contact with the surface of the display unit 10, and only the peripheral part of the lens array unit 20 is fixed to the second substrate 12 of the display unit 10. In other words, the display unit 10 and the lens array unit 20 are directly fixed by the support member 30 in the state in which the above-described gap control layer GCL is clamped therebetween. Thus, the distance between the display unit 10 and the lens array unit 20 is stably fixed and the stability of the display performance is secured.

In particular, in the example shown in FIG. 1, the lens array unit 20 includes the lens array layer 201 which is disposed on the area that is substantially equal to the display area DA, and the support member 30 is disposed between the second substrate 12 of the display unit 10 and the base body 202 of the lens array is unit 20.

The support member 30 may be disposed in a frame shape surrounding the display area DA, or may be formed of columnar body which are discretely disposed around the display area DA. The support member 30 includes a spacer for keeping a distance between the display unit 10 and the lens array unit 20.

For example, the support member 30 includes a plate-shaped spacer such as a metal plate, a resin plate or a glass plate, and is attached to the display unit 10 and lens array unit 20 by an adhesive. The support member 30 may not include the plate-shaped spacer, but may include a rod-shaped body or a small piece. In this case, a thermosetting resin or an ultraviolet-setting resin is usable as the adhesive. The support member 30 may be formed of an adhesive including a spacer for keeping a distance between the display unit 10 and the lens array unit 20. As the spacer included in the adhesive, use can be made of spacer beads, cut fibers or milled fibers. In this case, a thermosetting resin or an ultraviolet-setting resin is usable as the adhesive.

Figure 6:
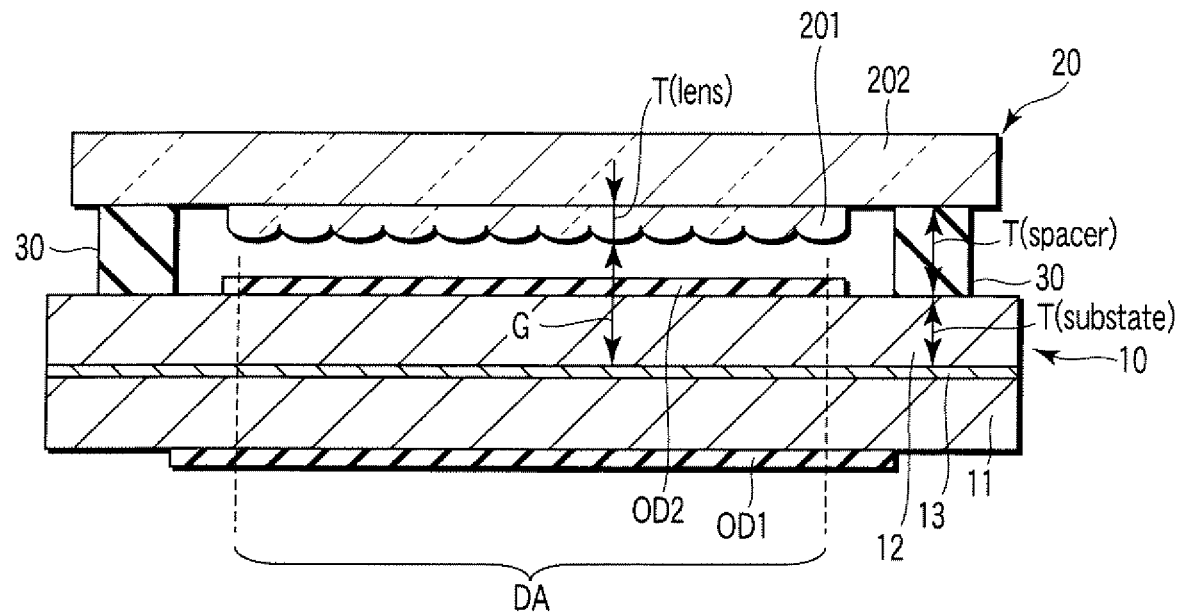
FIG. 6 schematically shows the structure of a display device according to a comparative example, as compared to the present embodiment.

With the above-described structure, the lens-pixel gap in the display area DA can be made uniform with high precision. FIG. 6 shows a comparative example for comparison with the present embodiment. A display device according to the comparative example includes a lens array unit 20 which has a lens array layer 201 on the surface of a base body 202, and a display unit 10 which is disposed to be opposed to the lens array unit 20. A peripheral part of the lens array unit 20 is fixed via a support member 30 to a second substrate 12, which is one of two substrates of the display unit 10 and is located on the lens array unit 20 side.

The lens-pixel gap, in this context, refers to a distance between the cylindrical lens of the lens array unit 20 and the pixel PX of the display unit 10. In the case where the liquid crystal display panel as shown in FIG. 3 is employed as the display unit 10, the lens-pixel gap corresponds, more exactly speaking, to the distance between the top portion of the cylindrical lens of the lens array layer 201 of the lens array unit 20 and the liquid crystal layer 13 of the liquid crystal display panel 10. In other words, although the lens-pixel gap is expressed by (thickness between lens array layer 201 and second optical element OD2)+(thickness of second optical element OD2)+(thickness of glass substrate 12A)+(thickness of counter-electrode CE)+(thickness of second alignment film AL2), (thickness of counter-electrode CE) and (thickness of second alignment film AL2) is very small, relative to the thickness of the other components, and is ignorable depending on the precision that is required.

In the combination between the display unit 10 and lens array unit 20, in order to obtain desired display characteristics, it is very important to make uniform the lens-pixel gap at least in the display area DA. In the comparative example shown in FIG. 6, the lens-pixel gap G is expressed by the following equation:

$$G = T(\text{substrate}) + T(\text{spacer}) - T(\text{lens})$$

where T (substrate) is the thickness of the second substrate 12, T (spacer) is the thickness of the support member 30, and T (lens) is the thickness of the lens array layer 201.

As described above, in the example shown in FIG. 6, the non-uniformity in the lens-pixel gap G is the sum of the non-uniformity of the T (substrate), T (spacer) and T (lens). In addition, since only the peripheral part of the lens array unit 20 is fixed by the support member 30 the lens array unit 20 may warp toward the display unit 10 side by its own weight. This phenomenon becomes conspicuous as the size of the screen increases. As a result, there arise the problem that the lens-pixel gap G becomes non-uniform in the display area. Under the circumstances, there is a demand for the structure that can make the lens-pixel gap G uniform in the display area, regardless of the magnitude of the weight of the lens array unit 20 itself.

To meet this demand, the present embodiment shown in FIG. 1 adopts the structure in which the gap control layer GCL with the uniform thickness is provided between the display unit 10 and the lens array unit 20. Thereby, it becomes possible to suppress the warp of the lens array unit 20 toward the display unit side by its own weight. Therefore, in the display area, the lens-pixel gap G can be more uniformly set at a desired value.

In the example shown in FIG. 1, a sheet-like layer is used as the gap control layer GCL. A light-transmissive resin film or glass plate is usable as the sheet-like gap control layer GCL, and the sheet-like gap control layer GCL has a substantially uniform thickness. Applicable methods for forming the gap control layer GCL include a method in which the gap control layer GCL is attached to the second optical element OD2 of the display unit 10, which is located on the lens array unit 20 side, by means of an adhesive or glue, and a method in which a liquid-phase resin material is formed by casting.

The form of the gap control layer GCL, which is applicable to the present embodiment, is not limited to the above-described sheet-like layer. Specifically, the gap control layer GCL is not limited to the sheet-like layer that is disposed almost over the entirety of the display area DA. A gap control layer GCL, which is composed of portions that are discretely disposed in the display area DA, for example, spherical body or columnar body, may be applicable.

Figure 7A:
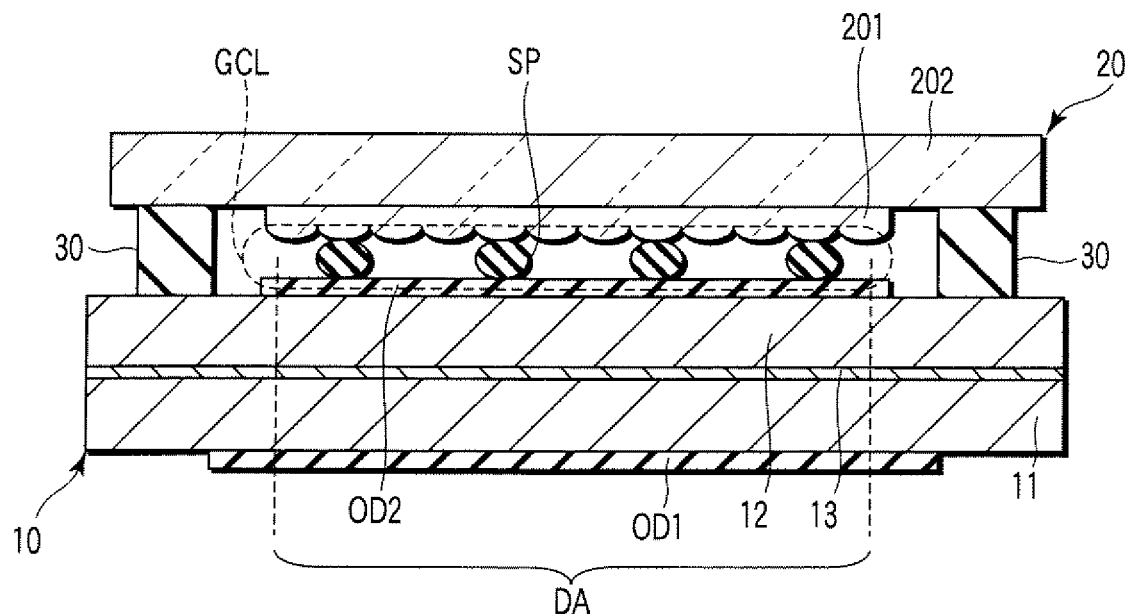
FIG. 7A schematically shows another structure of the display device according to the present embodiment.

In an example shown In FIG. 7A, the gap control layer GCL is composed of spherical spacers SP as spherical body. The spherical spacers SP can be formed of a material such as glass, resin or silica (silicon dioxide), and are disposed within a region surrounded by the support member 30. In addition, in order to reduce the influence on a display image by the lens function of each spherical spacer SP itself, the spherical spacers may be formed of a light-absorbing material (e.g. black material). In the case where spherical spacers SP with a very small diameter are used, a transparent material may be used.

The diameter of each spherical spacer SP may be set in a range of between several μm to several-hundred μm. If consideration is given to the influence on a display image by the lens function of the spherical spacer SP itself, it is desirable to set the diameter of the spherical spacer SP at a value that is sufficiently smaller than the horizontal pitch Ps (e.g. 500 μm) of the cylindrical lenses of the lens array layer 201.

In this example of structure, the spherical spacers SP are substantially uniformly dispersed on the second optical element OD2 and are clamped between the display unit 10 and the lens array unit 20. Accordingly, in the gap control layer GCL, most of the spherical spacers SP are clamped between the second optical element OD2 and the lens array layer 201.

Figure 7B:
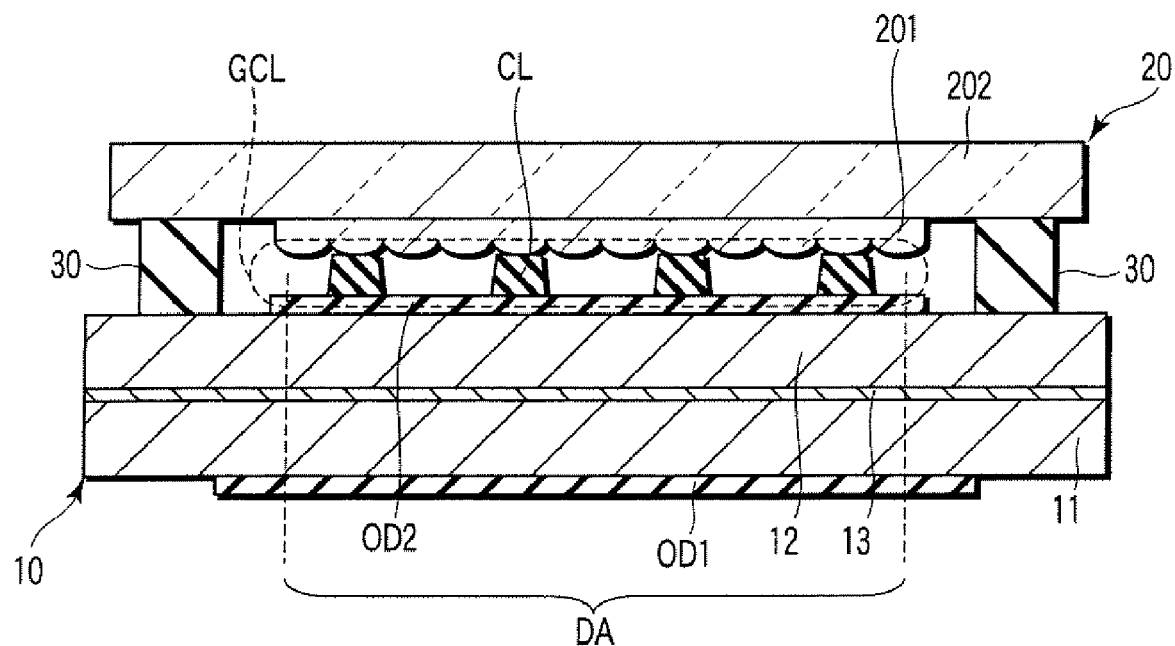
FIG. 7B schematically shows still another structure of the display device according to the embodiment.

In an example shown in FIG. 7B, the gap control layer GCL is composed of columnar spacers CL as columnar body. The columnar spacers CL are disposed within a region surrounded by the support member 30, and can be formed by photolithography by using a photosensitive resin material. Specifically, the columnar spacers CL can selectively be formed on the second optical element OD2. In the example shown in FIG. 7B, the columnar spacers CL are disposed such that their distal end portions come in contact with top portions of the lens array layer 201.

Figure 7C:
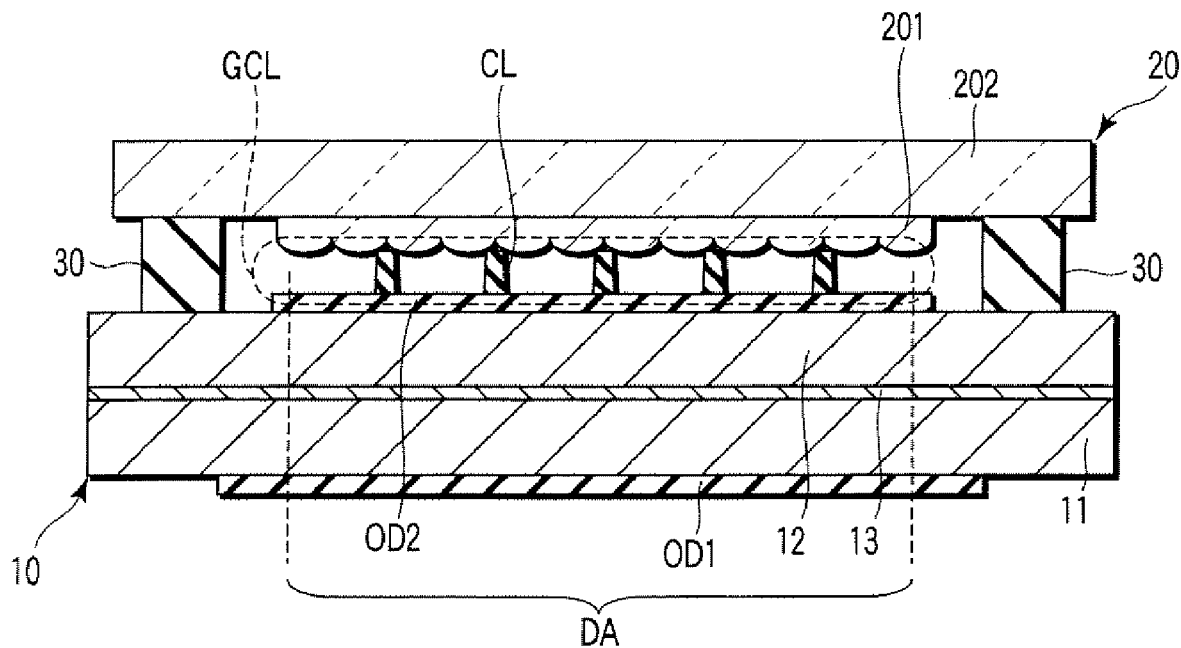
FIG. 7C schematically shows still another structure of the display device according to the embodiment.

Similarly, in an example shown in FIG. 7C, the gap control layer GCL is composed of columnar spacers CL. The columnar spacers CL are disposed on the second optical element OD2 such that their distal end portions come in contact with bottom portions of the lens array layer 201. In the case where such columnar spacers CL are used as the gap control layer GCL, the columnar spacers CL may be distributed with in-plane uniformity, or may be distributed with a high density at locations that require reinforcement.

Even in the case where the gap control layers GCL of the various types shown in FIG. 7A to FIG. 7C are used, like the example as described with reference to FIG. 1, the uniformity of the lens-pixel gap G in the display plane can be improved, and the excellent display characteristics can be realized.

In the above-described embodiment, the display unit 10 and lens unit 20 are fixed by the support member 30 that is disposed between the second substrate 12 of the display unit 10 and the base body 202 of the lens array unit 20. Alternatively, in order to reduce parameters which cause the non-uniformity of the lens-pixel gap G, the support member 30 may be disposed between the first substrate of the display unit 10 and the lens array unit 20.

Figure 8A:
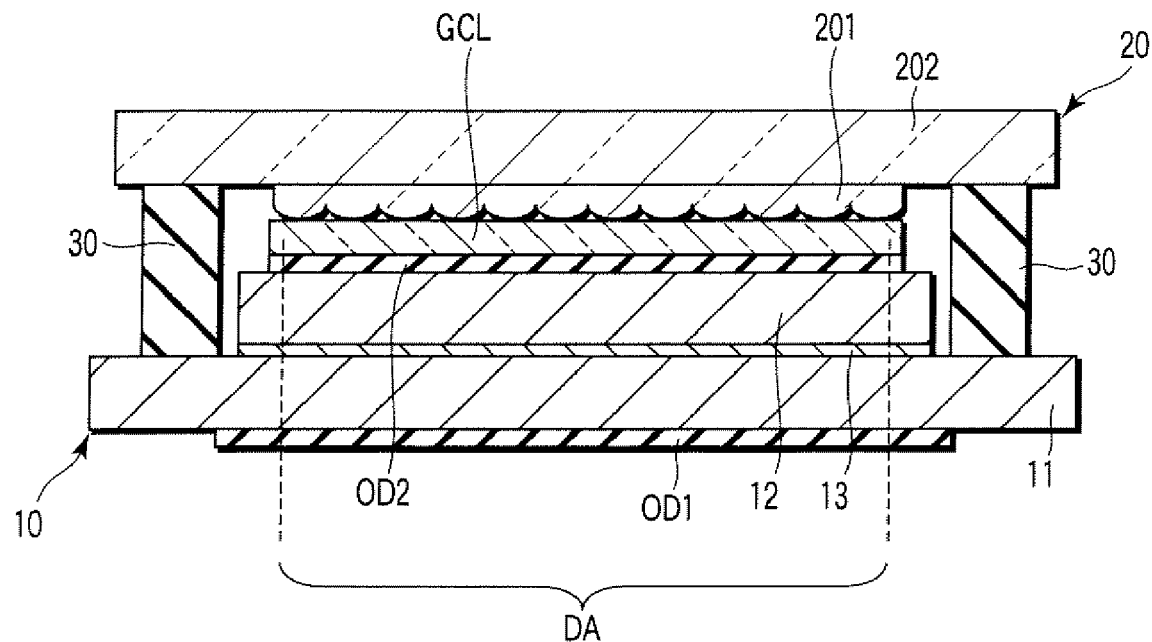
FIG. 8A schematically shows still another structure of the display device according to the embodiment.

In an example shown in FIG. 8A, the display unit 10 is formed to have such a size that the first substrate 11 is larger than the second substrate 12. Specifically, the first substrate 11 has portions extending outward of the second substrate 12. The lens array unit 20 is formed to have such a size that the base body 202 is greater than the lens array layer 201. The base body 202 has a greater size than the second substrate 12, and has portions which are opposed to the first substrate 11.

In this structure, the support member 30 is disposed between the first substrate 11, which is one of the two substrates of the display unit 10 and is located on the side farther from the lens array unit 20, and the base body 202 of the lens array unit 20, and the support member 30 fixes the first substrate 11 and the base body 202. In this example of structure, the lens-pixel gap G is expressed by the following equation:

$$G = T(\text{spacer}) - T(\text{lens}).$$

As described above, in the example shown in FIG. 8A, the non-uniformity of the lens-pixel gap G is the sum of the non-uniformities of T (spacer) and T (lens). Compared to the structure of the comparative example shown in FIG. 6, the number of parameters that cause the non-uniformity of the lens-pixel gap G is reduced by one. Therefore, in addition to the advantageous effect that is obtained by disposing the gap control layer GCL in the display area DA, it becomes possible to suppress the non-uniformity of the lens-pixel gap G, and to more uniformly control the lens-pixel gap G at a desired value.

Figure 8B:
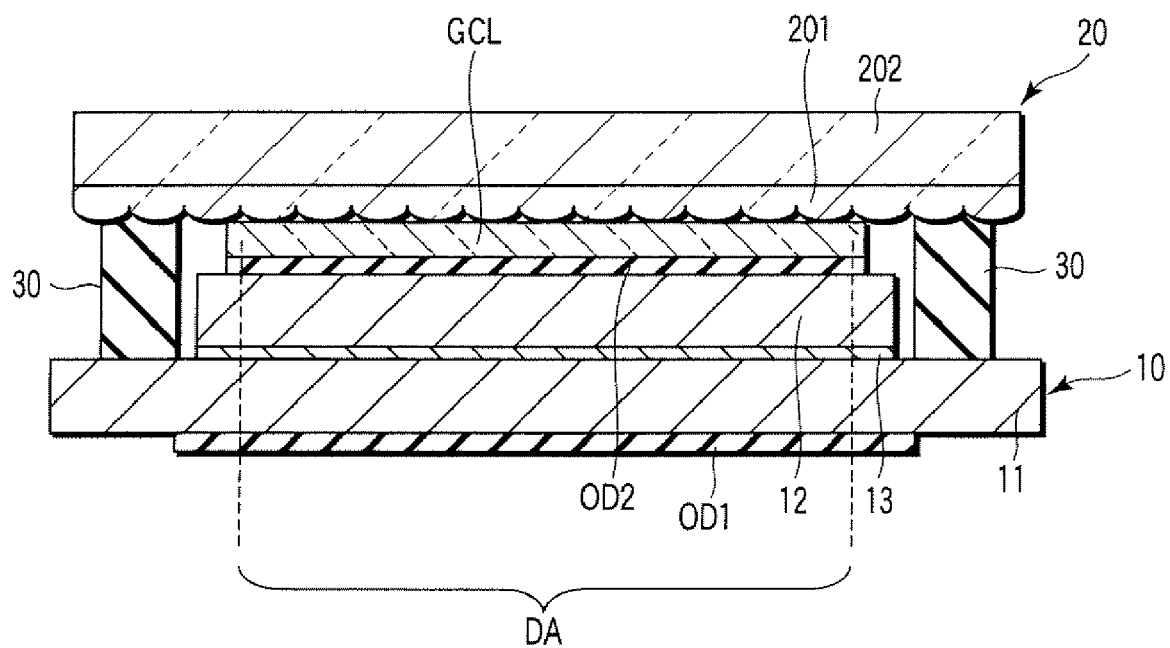
FIG. 8B schematically shows still another structure of the display device according to the embodiment.

In an example shown in FIG. 8B, like the example shown in FIG. 5A, the display unit 10 is formed to have such a size that the first substrate 11 is larger than the second substrate 12. Specifically, the first substrate 11 has portions extending outward of the second substrate 12. The lens array unit 20 includes a lens array layer 201 which is disposed over a greater area than the second substrate 12 of the display unit 10. The lens array layer 201 has portions which are opposed to the first substrate 11.

In this structure, the support member 30 is disposed between the first substrate 11, which is one of the two substrates of the display unit 10 and is located on the side farther from the lens array unit 20, and the lens array layer 201 of the lens array unit 20, and the support member 30 fixes the first substrate 11 and the lens array layer 201. In this example of structure, the lens-pixel gap G is expressed by the following equation:

$$G = T(\text{spacer}).$$

As described above, in the example shown in FIG. 8B, the non-uniformity of the lens-pixel gap G is the non-uniformity of T (spacer). Compared to the example shown in FIG. 8A, the number of parameters that cause the non-uniformity of the lens-pixel gap G is further reduced by one. Therefore, in addition to the advantageous effect that is obtained by disposing the gap control layer GCL in the display area DA, it becomes possible to further suppress the non-uniformity of the lens-pixel gap G, and to more uniformly control the lens-pixel gap G at a desired value.

In the examples shown in FIG. 8A and FIG. 8B, the sheet-like layers are used as the gap control layers GCL. Needless to say, the gap control layer GCL is not limited to these examples, and the gap control layers GCL shown in FIGS. 7A to 7C are applicable.

Next, as an example of the display device, a display device, which can display a stereoscopic image by a one-dimensional IP method or a multi-view method, is described.

Figure 9:
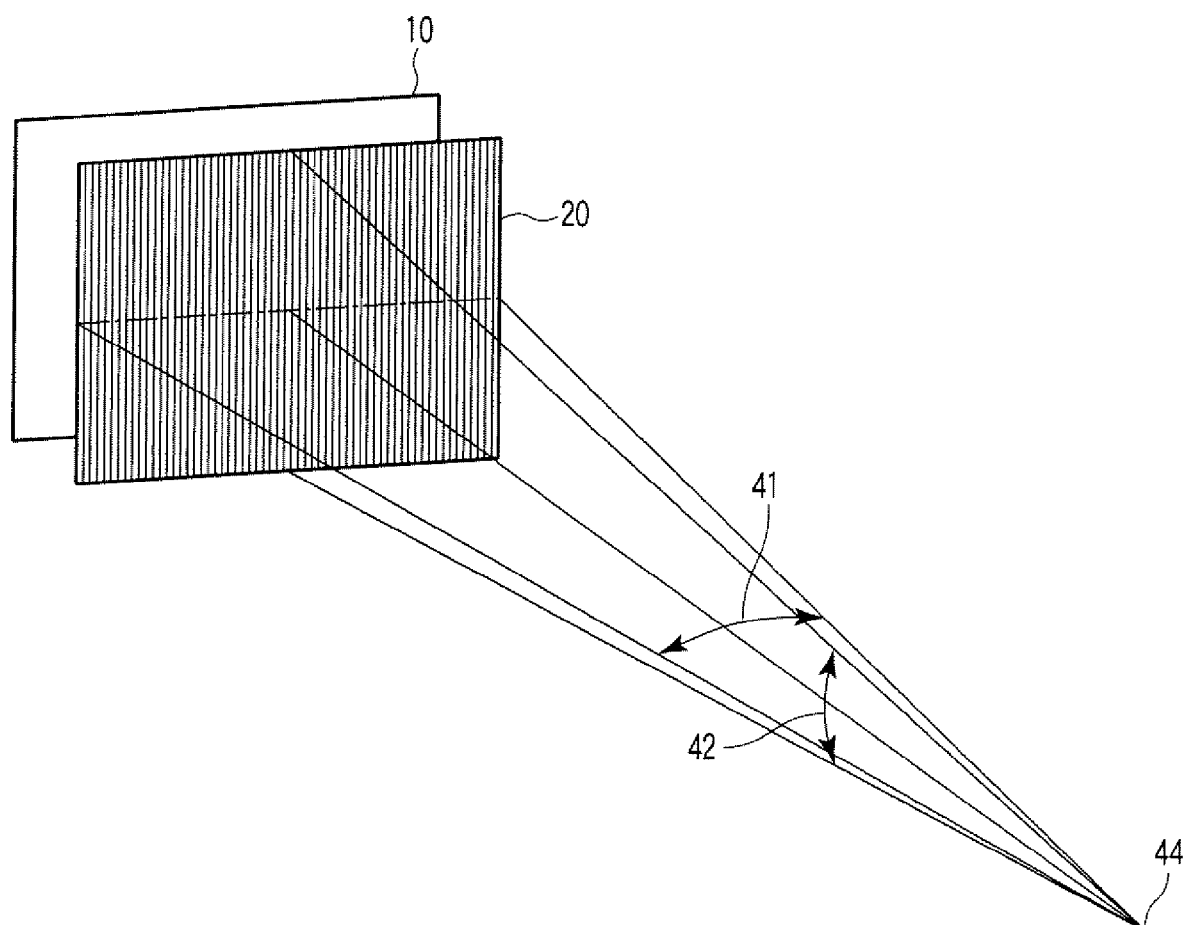
FIG. 9 is a perspective view that schematically shows the entire structure of a stereoscopic image display device according to an embodiment of the invention.

FIG. 9 is a perspective view which schematically shows the entirety of a stereoscopic video display device. The stereoscopic video display device includes a display unit 10 such as a liquid crystal display panel including an elementary image display section, and a lens array unit 20 which functions as a light ray control element having an optical aperture. The lens array unit 20 is disposed to be opposed to the elementary image display section, and performs stereoscopic display by light rays in respective directions which are based on respective lens principal points of the lens array layer as reference points. At an assumed position 44 of the observer, a stereoscopic image can be observed near a front face or a back face of the lens array unit 20 in ranges of a horizontal view angle 41 and a vertical view angle 42.

FIG. 10 is a development view that schematically shows a light ray reproduction range in a vertical plane and a horizontal plane, with the display section of the stereoscopic video display device shown in FIG. 9 being set as a reference. Part (a) of FIG. 10 is a front view of the display unit 10 and lens array unit 20. Part (b) of FIG. 10 is a plan view showing an arrangement of images of the stereoscopic video display device. Part (c) of FIG. 10 is a side view of the stereoscopic video display device. In FIG. 10, if the visual distance L between the lens array unit 20 and a visual distance plane 43, the horizontal pitch Ps in the lens array unit 20 and the gap d between the lens array unit 20 and the pixel plane are determined, the elementary image horizontal pitch Pe is determined by intervals with which aperture centers (or principal points) are projected from the view point on the visual distance plane 43 onto the elementary image display plane (pixel plane). Numeral 46 denotes lines that connect visual point positions and aperture centers (principal points), and the visual field width W is determined by the condition that elementary images do not overlap on the pixel plane. In the case of the one-dimensional IP method under the condition that pairs of parallel light rays are provided, the mean value of the horizontal pitch of elementary images is slightly greater than an integer number of times of the sub-pixel horizontal pitch, and the horizontal pitch of the lens array unit 20 is equal to the integer number of times of the sub-pixel horizontal pitch. In the case of the multi-view method, the horizontal pitch of elementary images is equal to the integer number of times of the sub-pixel horizontal pitch, and the horizontal pitch of the lens array unit is slightly smaller than integer number of times of the sub-pixel horizontal pitch.

Figure 11:
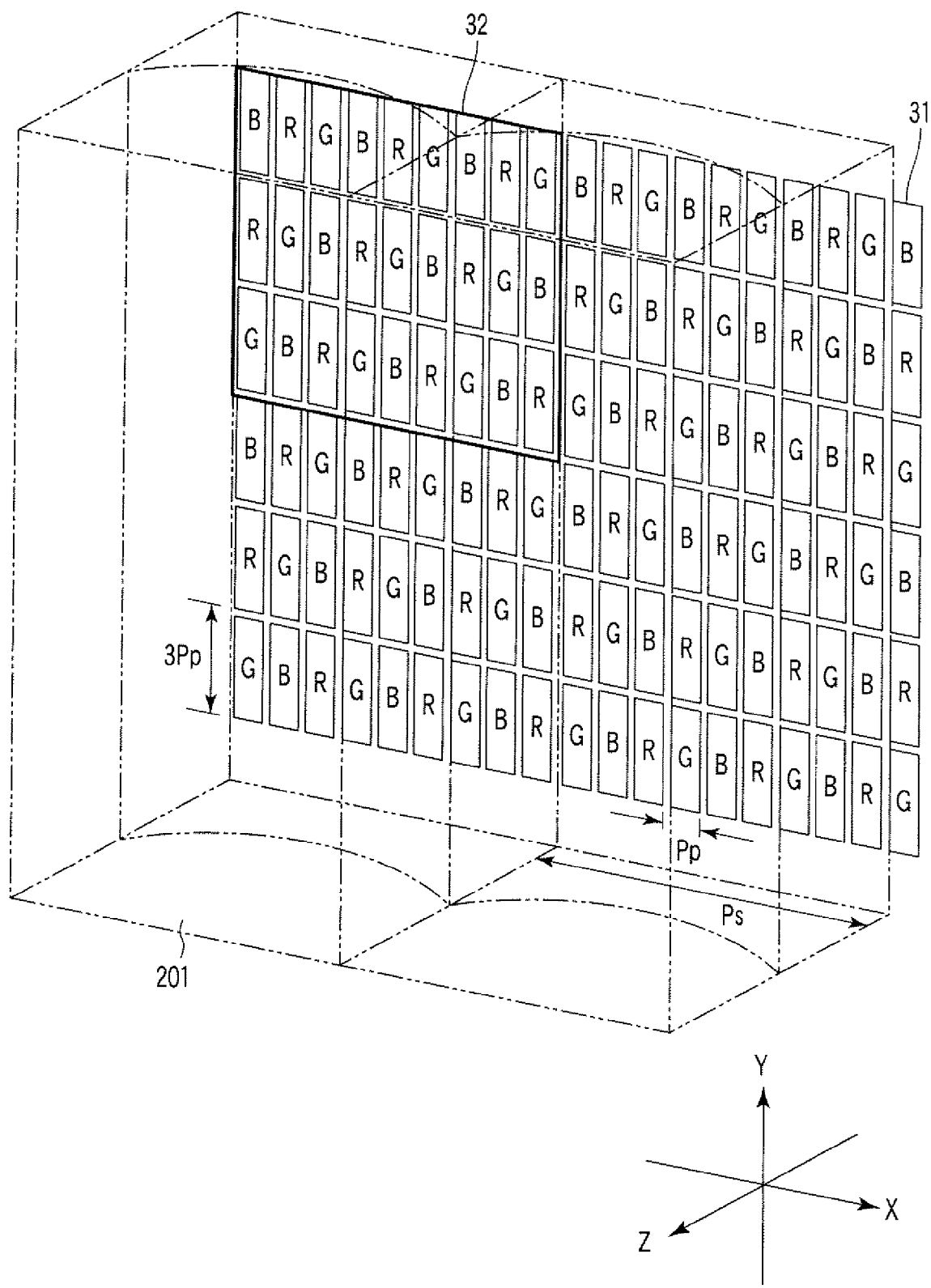
FIG. 11 is a perspective view that schematically shows a part of the structure of the stereoscopic image display device according to the embodiment of the invention.

FIG. 11 is a perspective view that schematically shows the structure of a part of the stereoscopic image display device. In this case, the lens array unit (lenticular sheet) 20, which is composed of a cylindrical lens array, is disposed in front of a planar elementary image display section such as a liquid crystal display panel. As shown in FIG. 11, in the elementary image display section, sub-pixels 31 each having a vertical-to-horizontal ratio of 3:1 are arranged substantially linearly in a matrix in a horizontal direction (X direction) and a vertical direction (Y direction). The sub-pixels 31 are disposed such that red (R), green (G) and blue (B) are alternately arranged in the row direction (X direction) and column direction (Y direction). This color arrangement is generally called "mosaic arrangement".

In the example shown in FIG. 11, one effective pixel 32 (indicated by a black-line box) at the time of stereoscopic image display is composed of sub-pixels 31 of 9 columns×3 rows. In this structure of the display section, the effective pixel 32 at the time of stereoscopic image display comprises 27 sub-pixels. Thus, if one parallax requires three color components, stereoscopic image/video display with 9 parallaxes in the X direction can be performed. The effective pixel, in this context, refers to a minimum-unit of sub-pixel group that determines the resolution at the time of stereoscopic display, and the elementary image refers to a group of parallax component images corresponding to one lens. Accordingly, in the case of the stereoscopic video display device which is configured to employ cylindrical lenses, one elementary image includes many vertically arranged effective pixels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the present invention is not limited to the case in which the display device is constituted as the stereoscopic video display device. The invention is applicable to other display devices which are configured such that a display panel and a lens array unit are fixed with a predetermined gap, for instance, a multi-view display which can simultaneously display different images at two or more directions.

What is claimed is:

1. A display device comprising:
    a lens array unit;
    a display unit which is configured such that a first substrate is attached to a second substrate that is disposed between the first substrate and the lens array unit, the display unit having a display area composed of matrix-arrayed pixels;
    a gap control layer which forms a predetermined gap between the display unit and the lens array unit; and
    a support member which fixes the display unit and the lens array unit on an outside of the display area of the display unit, wherein the gap control layer is disposed on an inside surrounded by the support member.

2. The display device according to claim 1, wherein the gap control layer is a spherical body or a columnar body.

3. The display device according to claim 1, wherein the gap control layer is a light-transmissive resin film or glass plate.

4. The display device according to claim 1, wherein the lens array unit includes a base body and a lens array layer which is provided on the base body and is opposed to at least the display area, and
    the lens array unit is one of a lens array unit which is integrally formed of the base body and the lens array layer which are formed of a glass, a lens array unit which is formed by attaching the lens array layer of a resin to the base body of a glass via an adhesive, and a lens array unit which is formed by molding the lens array layer of a resin directly on the base body of a glass.

5. The display device according to claim 1, wherein the display unit is a liquid crystal display panel.

6. The display device according to claim 1, wherein the display unit includes, in the display area, a plurality of sub-pixels which constitute an effective pixel at a time of stereoscopic video display.

7. The display device according to claim 1, wherein the support member is disposed between the first substrate of the display unit and the lens array unit.

8. The display device according to claim 1, wherein the lens array unit includes a base body and a lens array layer which is provided on the base body and is opposed to the display unit, and
    the support member is disposed between the first substrate of the display unit and the base body of the lens array unit.

9. The display device according to claim 1, wherein the lens array unit includes a base body and a lens array layer which is provided on the base body and is opposed to the display unit, and
    the support member is disposed between the first substrate of the display unit and the lens array layer of the lens array unit.

\* \* \* \* \*